United States Patent Office 3,838,178
Patented Sept. 24, 1974

3,838,178
2-ALKYL-SUBSTITUTED-1,2,3,4-TETRAHYDRO-ANTHRAQUINONES
Lawrence Graham Vaughan, Wilmington, Del., assignor to E. I. du Pont de Nemours and Company, Wilmington, Del.
No Drawing. Filed June 20, 1972, Ser. No. 264,577
Int. Cl. C07c 49/68
U.S. Cl. 260—369  8 Claims

ABSTRACT OF THE DISCLOSURE

2 - alkyl - substituted - 1,2,3,4, - tetrahydroanthraquinones are provided which may also be alkyl substituted in the 6- and/or 7-position. These compounds are provided by condensing a naphthoquinone with an alkyl-substituted butadiene, catalytically hydrogenating the adduct, then oxidizing the resulting hexahydro compound to the desired tetrahydroanthraquinone. Alternatively, the condensation product may be oxidized with a cupric compound or with air plus a weak base, and this compound catalytically hydrogenated and then oxidized to the corresponding tetrahydroanthraquinone. The compounds of this invention exhibit superior solubility in solvents commonly used in the cyclic process for manufacturing $H_2O_2$ and thus enhance $H_2O_2$ production.

BACKGROUND OF THE INVENTION

This invention relates to the preparation and use of alkyl-substituted tetrahydroanthraquinones, and more particularly to 2 - alkyl - 1,2,3,4 - tetrahydroanthraquinones which may also be alkyl-substituted in the 6- and/or 7- positions.

The use of alkyl-substituted anthraquinones and their tetrahydro derivatives in cyclic processes for the production of hydrogen peroxide is well known. Ferri Canadian Pat. 614,296, issued Feb. 7, 1961, and the following U.S. patents (whose issue dates are shown in parentheses) are representative of the many issued patents relating to anthraquinone processes for producing hydrogen peroxide: Reidl et al, 2,158,525 (5/16/39) and 2,215,883 (9/24/40); Dawsey et al. 2,537,655 (1/9/51), Sprauer 2,657,980 (11/3/53), Harris et al. 2,668,753 (2/9/54) and Hinegardner 2,689,169 (9/14/54); and Darbee et al. 3,062,622 (11/6/62), Hiratsuka et al. 3,038,786 (6/12/62), Dawsey 3,041,143 (6/26/62), Kabisch 3,328,128 (6/27/67), Kabisch et al. 3,488,150 (1/6/70) and Logan et al. 3,493,343 (2/3/70). In some cases, the presence of a limited amount of the tetrahydro form is regarded as advantageous since a higher active quinone concentration in the working solution can be achieved. However, two disadvantages of the tetrahydro form are also recognized:

1. It is less soluble than the parent anthraquinone and will precipitate from solution more readily, and,
2. It is oxidized more slowly.

As is recognized in such issued patents, it is important in commercial operations of such anthraquinone processes that the working solution employed have a high hydrogen peroxide synthesis capacity per cycle and that the hydrogen peroxide solution obtained in the extraction step be relatively concentrated. The synthesis capacity per cycle is determined largely by the solubility of the working intermediate employed, particularly in its anthrahydroquinone form, and of course also by the particular solvent or solvent mixture used, which factors also determine the maximum concentration of hydrogen peroxide obtainable in the extract product solution.

In copending Ser. No. 79,642, filed Oct. 9, 1970, now U.S. Pat. 3,778,452; the disclosure of which is incorporated herein by reference, Josey and Kirchner teach a 1,4,4a,9a - tetrahydro - 1 - alkenyl - 9,10 - anthraquinone of structural formula

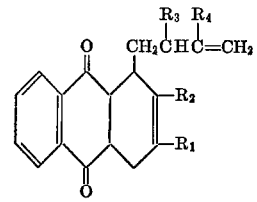

in which each of $R_1$ and $R_4$ is an alkyl group, or either is an alkyl group and the other is hydrogen; and each of $R_2$ and $R_3$ is an alkyl group or hydrogen, provided that $R_2$ is always hydrogen when each of $R_1$ and $R_3$ is hydrogen; said alkyl group or groups being 1 to 8 carbon straight chain hydrocarbon alkyl groups.

Alkenyl anthraquinones can be converted to the corresponding tetrahydroalkylanthraquinones, which have excellent utility as working intermediates in the cyclic process for the production of hydrogen peroxide. This conversion is accomplished by aromatizing the 1-alkenyl-substituted ring with oxygen (air) in the presence of a strong base, followed by hydrogenation according to the process taught by the copending application of Kirchner and Vaughan, Ser. No. 79, 643, filed Oct. 9, 1970, now abandoned, the disclosure of which is incorporated herein by reference. According to Kirchner and Vaughan, the alkenyl substituent is converted to the corresponding alkyl substituent

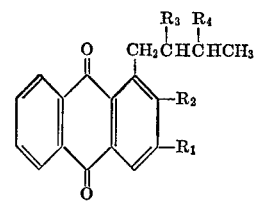

by hydrogenation in the presence of a platinum catalyst on a charcoal support. Hydrogenation in the presence of Raney nickel catalyst converts this to 5,6,7,8-tetrahydro-1-alkylanthraquinones of the formula

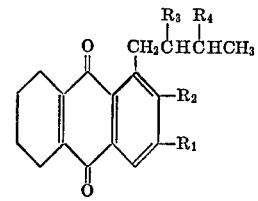

Although a wide variety of tetrahydroanthraquinones has been disclosed in the literature, all are characterized by an unsubstituted tetrahydro ring.

SUMMARY OF THE INVENTION

It has now been discovered that certain tetrahydro-2-alkylanthraquinones characterized by having the tetrahydro ring substituted, exhibit outstanding solubilities in both their anthraquinone and anthrahydroquinone forms in working solvents of the types commonly used, and that such anthraquinones are, therefore, particularly well suited for use in cyclic anthraquinone processes for producing hydrogen peroxide. Thus, their high solubilities permit the use of working solutions at substantially greater anthraquinone concentrations than were heretofore practical, with consequent higher synthesis capacities per cycle and relatively concentrated hydrogen peroxide extract products. The high solubility of the anthrahydroquinone form also permits use of less, or even no, hydroquinone-type solvent, i.e., only an anthraquinone-type solvent, in the working solvent. This is highly desirable since extraction of hydrogen peroxide from the working solvent is thereby made easier. If the hydroquinone-type solvent is eliminated entirely, process benefit obviously accrues.

According to the present invention there is provided a 2-alkyl-substituted-1,2,3,4-tetrahydroanthraquinone of the formula

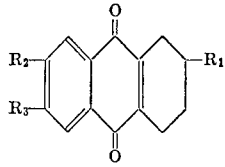

wherein $R_1$ is an alkyl group containing 1–10 carbon atoms and $R_2$ and $R_3$ are hydrogen or alkyl groups containing 1–6 carbon atoms. Preferably, $R_1$ will contain 1–6 carbon atoms nd $R_2$ and $R_3$ will be hydrogen.

There are further provided solutions of the above tetrahydroanthraquinones in water-immiscible solvents and mixed solvents and the use of such tetrahydroanthraquinones and solutions in a cyclic process for the production of hydrogen peroxide by oxidation and reduction of alkylated anthraquinones.

DETAILED DESCRIPTION OF THE INVENTION

Preparation of the tetrahydroanthraquinone compounds of this invention is depicted by the following diagram.

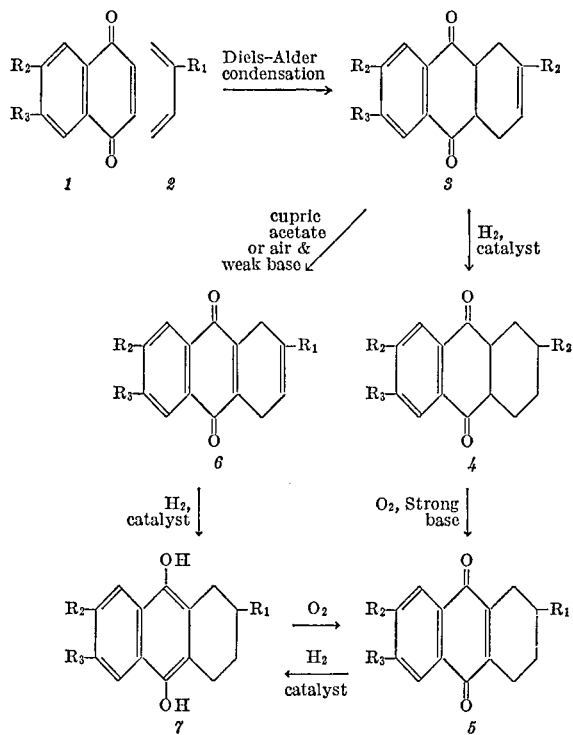

$R_1$ is an alkyl having 1–10 carbon atoms.
$R_2$ and $R_3$ may be hydrogen or an alkyl having 1–6 carbon atoms.

The alkyl groups may be branched.

Compound 3 is prepared by reacting naphthoquinone or a substituted naphthoquinone 1 with 2-alkyl butadienes 2 according to procedures taught by the aforementioned Serial No. 79,642. In brief, the Diels-Alder condensation reaction to produce the 1,4,4a,9a-tetrahydro-2-alkylanthraquinone of formula 3 is carried out by contacting 1,4-naphthoquinone and an alkyl substituted butadiene at a temperature from about 25 to 150° C. until the desired condensation has occurred. The preferred reaction temperatures range from about 50 to 125° C. The reaction can be carried out in either the presence or the absence of a solvent, although the presence of an organic solvent or diluent is generally preferred. When a solvent is used, it should be one that is inert toward each reactant and the condensation adduct and is preferably a solvent for at least one of the reactants and preferably both. Suitable solvents are: ketones such as acetone and methyl ethyl ketone; ethers such as tetrahydrofuran and dioxane; alcohols such as methanol, ethanol and isopropanol; esters such as ethyl acetate; and hydrocarbons such as benzene and cyclohexane. The condensation adducts can be separated from the reaction mixture, if separation is desired, by conventional methods, e.g., by cooling the reaction mixture to crystallize out the adduct, which can then be removed by filtration, or by evaporating off the solvent, if a solvent is used. Ordinarily, separation of the adduct from the reaction mixture will not be necessary. Generally, the naphthoquinone and butadiene reactants will be employed in approximately equimolar proportions, although either may be employed in considerable excess, if desired.

The reaction to produce compound 4 is carried out by hydrogenating a solution of compound 3 at a temperature from about 20 to 125° C., preferably 20 to 50° C. in the presence of a Group VIII transition metal or a Raney nickel catalyst and under a hydrogen pressure of from about 0.5 to 100, preferably 1 to 50, atmospheres. The preferred catalysts are those of the platinum metal group and of these, the most preferred catalysts are palladium and platinum. The catalysts may be supported or not and may be supplied in the form of the metal or as a compound thereof, e.g., the oxide, the chloride or the acetate, in which case the compound will be reduced in situ to the active metal catalyst. Catalyst concentrations, calculated as the metal and based upon the weight of the compound to be hydrogenated, ranging from about 0.01 to 100% are generally suitable. The preferred concentrations range from 0.5 to 10%.

Any organic solvent which is inert under the reaction conditions and which will dissolve the compounds to be hydrogenated under the conditions of use can be employed. Illustrative of such solvents are the hydrocarbons such as benzene, cyclohexane and pentane; the ethers such as diethyl ether, tetrahydrofuran and dioxane; the esters such as methyl acetate and ethyl acetate; the alcohols such as methanol, ethanol and isopropanol; and the ketones such as acetone and methyl ethyl ketone.

The oxidation of the 1,2,3,4-tetrahydro derivative 4 with molecular oxygen in the presence of a strong base readily converts such compounds to the anthraquinones of formula 5. Air is the preferred source of molecular oxygen. Suitable strong bases are the alkali metal hydroxides, of which potassium hydroxide is preferred, and strong organic bases such as 1,5-diazabicyclo[4.3.0]non-5-ene (DBN) and the quaternary ammonium hydroxides such as tetramethylammonium hydroxide. Although the presence of a solvent or diluent is not essential, it is preferred that the reaction be carried out in the presence of a solvent. Suitable solvents include an alcohol such as methanol or ethanol; a ketone such as acetone or methyl ethyl ketone; an ester such as ethyl acetate; or a hydrocarbon such as benzene or cyclohexane. Reaction temperatures from about 0 to 150° C. are generally suitable and the preferred temperatures range from about 20 to 50° C.

Reduction of compounds of type 5 over a noble metal gives hydroquinones of type 7 which, upon oxidation with air or oxygen, give hydrogen peroxide and are reconverted to 5. The cyclical hydrogenation and oxidation of the keto groups of an anthraquinone is well known in the manufacture of hydrogen peroxide, as may be seen from the various patents referred to above.

An alternative synthesis of compounds of type 5 consists of oxidizing 3 to 6 with cupric acetate, preferably, or another cupric salt such as cupirc chloride, e.g., in an aqueous acetic acid medium. Alternatively, this oxidation may be performed by molecular oxygen. Air is preferred as the source of molecular oxygen and ammonia, sodium acetate and the mono-, di- and tri-alkylamines such as methylamine, diethylamine, triethylamine and di-isopropylethylamine are examples of suitable weak bases. The reaction can be carried out in the absence of any solvent or diluent; however, it is preferred to utilize one of the solvents or media mentioned above in connection with the oxidation of compound 4. The preferred medium is aqueous ethanol. Reaction temperatures ranging from about 0 to 100° C. are generally suitable and the preferred temperatures range from about 20 to 50° C. Catalytic reduction, as already described in connection with compound 3, converts 6 to 7. This catalytic reduction may be performed in the hydrogenator of a cyclical process for producing hydrogen peroxide, as described in U.S. Pat. 2,657,980, for example, thus permitting compound 6 to be added directly to the hydrogen peroxide process without need for preparing compound 7 separately. In such a case the hydrogenation would involve addition of two equivalents of hydrogen, one to saturate the 1,2,3,4-ring, the other to convert the keto groups to anthrahydro groups.

The invention may be better understood by reference to the following examples. In each of the a compounds, $R_1$ is $CH_3$; in the b compounds, $R_1$ is $C_2H_5$; in 2c, $R_1$ is $C_6H_{11}$ (myrcene, a compound occurring naturally in a variety of plants); in 5c, $R_1$ is $C_6H_{13}$ (isohexyl, produced by the catalytic hydrogenation of the double bond in the myrcene side chain). $R_2$ and $R_3$ are hydrogen in all cases except Example 6, in which they are $CH_3$. Compounds 3a-d and 6 were prepared according to the procedures described in detail in Ser. No. 79,642 and summarized hereinabove.

EXAMPLE 1

2-methyl-1,4-dihydroanthraquinone, compound 6a

A 7.8 g. sample of the isoprene-naphthoquinone adduct (3a) was suspended in 100 ml. ethanol and 10 drops of diisopropylethylamine added. The mixture was stirred overnight while exposed to air. The precipitated yellow product (5.5 g., 71% yield) was collected on a sintered glass filter and washed with diethyl ether. An analytical sample, after recrystallization from ethanol, had m.p. 164–166°.

Analysis.—Calcd. for $C_{15}H_{12}O_2$ (percent): C, 80.33; H, 5.40. Found (percent): C, 80.41; H, 5.19.

In the NMR spectrum of the product ($CDCl_3$), an $A_2B_2$ aromatic pattern occurred at 7.82 (4H), a multiplet at 5.50 (1H), a singlet at 3.16 (4H) and a singlet at 1.82 p.p.m. (3H).

EXAMPLE 2

2-methyl-1,2,3,4-tetrahydroanthraquinone, compound 5a

A 22.1 g. sample of 2-methyl-1,4-dihydroanthraquinone was hydrogenated in ethyl acetate using a 5% Pd/C catalyst until the expected two equivalents of hydrogen were taken up. The solution was then filtered to remove catalyst and the solvent blown off with air. The residue was chromatographed on acidic alumina using 1:3 benzene: hexane solution as the eluent. After removal of solvent from the product fraction, the sample was recrystallized from ethanol to give 4.2 g. (19% yield) bright yellow product, m.p. 103–104°.

Analysis.—Calcd. for $C_{15}H_{14}O_2$ (percent): C, 79.62; H, 6.24. Found (percent): C, 79.82; H, 6.13.

In the NMR spectrum of the product ($CDCl_3$), an $A_2B_2$ aromatic pattern occurred at 7.75 (4H), complex multiplets at 1.2–3.2 (7H), and a sharp doublet (J = 5.0 cps.) at 1.06 p.p.m. (3H).

EXAMPLE 3

2-ethyl-1,4,1a,4a-tetrahydroanthraquinone, compound 3b

A solution of 59.0 g. (0.72 mole) 2-ethylbutadiene and 88.0 (0.56 mole) naphthoquinone in 350 ml. ethanol was refluxed for nine hours. On cooling, 128 g. crude product was obtained (96% yield). An analytical sample, after recrystallization from hexane, had m.p. 88–89°.

Analysis.—Calcd. for $C_{16}H_{16}O_2$ (percent): C, 79.97; H, 6.71. Found (percent): C, 80.03; H, 6.69.

In the NMR spectrum of the product ($CDCl_3$), signals occurred at 7.6–8.1 ($A_2B_2$ multiplet, 4H), 5.41 (multiplet, 1H), 3.2–3.6 (multiplet, 2H), 1.7–2.6 (multiplet, 6H), and 1.00 p.p.m. triplet, J=7.0 cps., 3H).

EXAMPLE 4

2-ethyl-1,2,3,4-tetrahydroanthraquinone, compound 5b

A 12.0 g. sample of the naphthoquinone-2-ethylbutadiene (3d) adduct was dissolved in 250 ml. ethyl acetate and hydrogenated at room temperature using 1.0 g. 5% Pt/C catalyst. After the solution was filtered, 1.0 ml. DBN (1,5-diazabicyclo[4.3.0]non-5-ene) was added and air was blown through the stirred solution for four hours.

After removal of the solvent on the steam bath, the residue was chromatographed twice on acidic alumina using benzene as the eluent. Removal of solvent left 4.1 g. product (34% yield). An analytical sample, after recrystallization from methanol, had m.p. 88–89°.

Analysis.—Calcd. for $C_{16}H_{16}O_2$ (percent): C, 79.97; H, 6.71. Found (percent): C, 80.12; H, 6.76.

In the NMR spectrum ($CDCl_3$), an $A_2B_2$ aromatic pattern occurred at 7.3–8.1 p.p.m. (4H). Complex multiplets occurred from 0.7–3.2 p.p.m. (12H).

EXAMPLE 5

2-isohexyl-1,2,3,4-tetrahydroanthraquinone, compound 5c

A 21.0 g. sample of the myrcene-naphthoquinone adduct (3c) was dissolved in 175 ml. ethyl acetate and hydrogenated at 30 p.s.i. using 1.5 g. 5% Pt/C catalyst. The solution absorbed the theoretical amount of hydrogen in two hours, and the solution was then filtered. After the addition of 0.5 ml. DBN, the solution was stirred overnight while exposed to air. After evaporation of the solvent, the residue was dissolved in benzene and chromatographed on acidic alumina. A yellow fraction was collected and the benzene evaporated. Recrystallization of the crude solid from isopropanol gave 1.8 g. product (8.5% yield), m.p. 86–87°.

Analysis.—Calcd. for $C_{20}H_{24}O_2$ (percent): C, 81.04; H, 8.16. Found (percent): C, 81.08; H, 8.19.

In the NMR spectrum ($CDCl_3$), signals occurred at 7.5–8.1 ($A_2B_2$ multiplet, 4H), 1.1–3.1 (complex multiplets, 14H), and 0.88 p.p.m. (doublet, J=6.0 cps., 6H).

The terahydroanthraquinones of type 5 and their corresponding hydroquinones have unexpectedly high solubilities in the solvents used to prepare the so-called "working solution" of the cyclical hydrogen peroxide process. For example, as illustrated in Table I, the tetrahydroanthraquinone 5b is almost twice as soluble as the commonly-used 5,6,7,8-tetrahydroanthraquinone. Likewise, as shown in Table II, the hydroquinone form 7b of tetrahydroanthraquinone 5b is about twice as soluble in p-xylene as the hydroquinone form of 2-ethyltetrahydroanthraquinone. The high solubility in xylene allows it or related alkyl aromatics to be used as the sole solvent in the "working solution" of a cyclical hydrogen peroxide process. Suitable alkyl aromatics include methyl naphthalene and "Hi-Sol 15," an alkyl benzene mixture sold by Ashland Chemical Co. This high solubility results in greater productivity of hydrogen peroxide per volume of working solution. These advantages are illustrated by the following examples.

EXAMPLE 6

An excess of the quinone was stirred with a 60/40 weight percent mixture of xylene/diisobutylcarbinol (DIBC) at 30° C. for 48 hours. Excess quinone was then removed by filtering the mixture through a sintered glass filter. A weighed sample of the filtered solution was then stripped of solvent using a high vacuum pump and a heat lamp. The quinone residue was then weighed. Results in Table I are expressed as $$\frac{\text{Weight of quinone}}{\text{Weight of solvent} + \text{quinone}} \times 100$$

TABLE I

Quinone solubility in 60/40 weight percent xylene/DIBC mixture as 30° C.

Compound: Solubility, percent
2-ethyl-5,6,7,8-tetrahydroanthraquinone _____ 11.3
2-ethyl-1,2,3,4-tetrahydroanthraquinone (5b)__ 20.2
1:1 mixture_____ 25.3

EXAMPLE 7

A weighed quantity of the quinone was placed in a flask with a magnetic stirrer and a weighed quantity of both catalyst (0.45% palladium or alumina) and solvent then added. The mixture was then hydrogenated until a full equivalent of hydrogen was absorbed. Diethyl ether was added near the end of the run to dissolve the precipitated hydroquinone. The mixture was then filtered (under hydrogen) to remove catalyst and the ether removed with a vacuum pump. The solution was then stirred and slowly warmed (one degree per minute) until the hydroquinone dissolved. The temperature at which solution occurred is recorded in Table II.

TABLE II.—HYDROQUINONE SOLUBILITY IN p-XYLENE

| Parent quinone | Concentration | Saturation temperature, degrees |
|---|---|---|
| 2-ethyl-5,6,7,8-tetrahydroanthraquinone | 5.7 | 90 |
| 2-ethyl-1,2,3,4-tetrahydroanthraquinone (7b) | 11.1 | 94 |
| 1:1 mixture | 5.5 | 65 |
| Do | 3.9 | 30 |

EXAMPLE 8

The ability of the compounds of this invention to produce $H_2O_2$ was demonstrated as follows.

Weighed samples (about 1 gram each) of various tetrahydro-2-alkylanthraquinones of Formula 5 were dissolved in about 10–20 grams of p-xylene and to each resulting solution there was added about 1.0 gram of a palladium-on-alumina catalyst (0.45% palladium). In each case, the resulting mixture was hydrogenated to convert the anthraquinone completely to its anthrahydroquinone form; 10 ml. of diethyl ether was added and the catalyst was then filtered off. In each case, 10 ml. of water was added and the mixture was oxidized by blowing a slow stream of air therethrough until the yellow color of the anthraquinone reappeared. The aqueous layer was separated and the organic layer was extracted twice with 10-ml. portions of water. The hydrogen peroxide content of the combined aqueous layers was determined by titration with ceric ammonium nitrate solution. The yields of hydrogen peroxide formed, based upon the amount of starting anthraquinone compound used, were almost quantative (93–100%).

It will be apparent to one familiar with the cyclical process for $H_2O_2$ production that the tetrahydroanthraquinones of this invention may be mixed in such process with those anthraquinones and tetrahydroanthraquinones commonly used in the working solution. These include 2-ethylanthraquinone, 2-t-butylanthraquinone, their tetrahydro derivatives, as well as any of those disclosed in the patents cited herein. The improved solubility of the compounds of this invention will enhance the productive capacity of such prior art working solutions. In such mixtures the concentration of any given quinone would be about 0–20%, preferably about 0–10%, by weight.

I claim:
1. The tetrahydroanthraquinone which is 2-methyl-1,2,3,4-tetrahydroanthraquinone.
2. The tetrahydroanthraquinone which is 2-ethyl-1,2,3,4-tetrahydroanthraquinone.
3. The tetrahydroanthraquinone which is 2-n-butyl-6,7-dimethyl-1,2,3,4-tetrahydroanthraquinone.
4. The tetrahydroanthraquinone which is 2-isohexyl-1,2,3,4-tetrahydroanthraquinone.
5. A solution of a tetrahydroanthraquinone of Claim 1 in a water-immiscible solvent.
6. A solution of a tetrahydroanthraquinone of Claim 2 in a water-immiscible solvent
7. A solution of the tetrahydroanthraquinone of Claim 3 in a water-immiscible solvent.
8. A solution of a tetrahydroanthraquinone of Claim 4 in a water-immiscible solvent

References Cited
UNITED STATES PATENTS
3,307,909  3/1967  Reilly _____ 260—369
FOREIGN PATENTS
614,296  2/1961  Canada _____ 260—369
OTHER REFERENCES
Syavtsillo et al., as cited in Chem Abstracts, 53, 1274 (1959).
Cameron et al., J. Chem. Soc., c. 1968, (13), 1615–1619 (1968).

LORRAINE A. WEINBERGER, Primary Examiner
E. J. SKELLY, Assistant Examiner

U.S. Cl. X.R.
423—588